United States Patent
Moore

(10) Patent No.: US 12,051,378 B2
(45) Date of Patent: Jul. 30, 2024

(54) LCD DEVICE AND METHOD OF OPERATION

(71) Applicant: Illions Limited, Oxfordshire (GB)

(72) Inventor: James Moore, Oxfordshire (GB)

(73) Assignee: ILLIONS LIMITED, Chipping Norton (GB)

( * ) Notice: Subject to any disclaimer, the term of this patent is extended or adjusted under 35 U.S.C. 154(b) by 0 days.

(21) Appl. No.: 18/005,760

(22) PCT Filed: Jul. 13, 2021

(86) PCT No.: PCT/GB2021/051790
§ 371 (c)(1),
(2) Date: Jan. 17, 2023

(87) PCT Pub. No.: WO2022/013540
PCT Pub. Date: Jan. 20, 2022

(65) Prior Publication Data
US 2023/0298534 A1    Sep. 21, 2023

(30) Foreign Application Priority Data
Jul. 14, 2020 (GB) .................................. 2010813

(51) Int. Cl.
*G09G 3/34* (2006.01)
*G09G 3/3208* (2016.01)
*G09G 3/36* (2006.01)

(52) U.S. Cl.
CPC ......... *G09G 3/3406* (2013.01); *G09G 3/3208* (2013.01); *G09G 3/36* (2013.01); *G09G 2320/0666* (2013.01)

(58) Field of Classification Search
CPC .............. G09G 3/3208; G09G 3/3406; G09G 2320/0666; G09G 3/36; G09G 3/3607; G09G 2360/144; H04N 7/15; H04N 7/144
See application file for complete search history.

(56) References Cited

U.S. PATENT DOCUMENTS 10,838,468 B2 * 11/2020 Bikumala ............. G06F 1/1637
2005/0024489 A1    2/2005 Fredlund et al.
(Continued)

FOREIGN PATENT DOCUMENTS

EP    0704135    8/1999
EP    2225602    7/2017
(Continued)

OTHER PUBLICATIONS

Examination Report under Section 18(3) for UK Application No. GB2010813.0 mailed Nov. 23, 2022, 7 pages.
(Continued)

*Primary Examiner* — Muhammad N Edun
(74) *Attorney, Agent, or Firm* — Womble Bond Dickinson (US) LLP

(57) ABSTRACT

A method of operating a liquid crystal display (LCD) device is disclosed. The device comprises an LCD screen held by a housing, a camera positioned within the housing, and a backlight arranged to illuminate the LCD screen. The method comprises displaying a first image on the LCD screen by setting a first set of elements of the LCD screen to transmit light and illuminating the LCD screen with the backlight. After switching off the backlight, a second set of elements is set to transmit light with colour filters off, and an image is captured with the camera. After capturing the image, a second image is displayed on the LCD screen by
(Continued)

setting a third set of elements to transmit light and illuminating the LCD screen with the backlight.

19 Claims, 3 Drawing Sheets

(56) References Cited

U.S. PATENT DOCUMENTS

| | | |
|---|---|---|
| 2007/0002130 A1 | 1/2007 | Hartkop |
| 2009/0102763 A1* | 4/2009 | Border .................. H04N 7/144 |
| | | 345/87 |
| 2010/0073456 A1 | 3/2010 | Bolle |
| 2012/0127084 A1* | 5/2012 | Large .................. G06F 3/0416 |
| | | 345/173 |
| 2013/0321686 A1 | 12/2013 | Tan et al. |
| 2015/0035936 A1 | 2/2015 | Robinson et al. |
| 2016/0133200 A1 | 5/2016 | Kim et al. |
| 2017/0251137 A1 | 8/2017 | Evans, V et al. |
| 2018/0107241 A1* | 4/2018 | Evans, V ............... H04N 23/50 |

FOREIGN PATENT DOCUMENTS

| | | |
|---|---|---|
| JP | 104172494 | 6/1992 |
| JP | 2007082107 | 3/2007 |
| WO | 2016197092 | 12/2016 |

OTHER PUBLICATIONS

Combined Search and Examination Report under Sections 17 and 18(3) for UK Application No. GB2010813.0 mailed Jan. 11, 2021, 9 pages.

International Search Report and Written Opinon for International Application No. PCT/GB2021/051790 mailed Oct. 19, 2021, 17 pages.

* cited by examiner

LCD DEVICE AND METHOD OF OPERATION

FIELD OF THE INVENTION

The invention relates to liquid crystal display, LCD, device with a camera, such as a videoconferencing device with an LCD screen.

BACKGROUND

Videoconferencing devices are widely used to provide video communications between a local user and a remote user. A videoconferencing device may use an LCD screen to display the remote user to the local user. An LCD screen comprises a number of elements (or pixels) which can be set to transmit or block light. As the LCD elements themselves do not generate light, a backlight is positioned behind the screen to illuminate the elements. The elements transmit or block light from the backlight to form an image on the screen.

Each element comprises a liquid crystal sandwiched between two linear polarisers. The linear polarisers are orthogonally arranged, such that in the absence of the liquid crystal the pair of polarisers would block all light. When no electric field is applied to the liquid crystal, light passes through the liquid crystal unaltered—and so in this 'off' state the pair of polarisers block the light. When an electric field is applied to the liquid crystal, the liquid crystal rotates the light, so that at least a component of the light can pass through the outer polariser, making the element translucent or transparent. In colour LCD screens, each LCD element comprises a red, a green, and a blue sub-element, comprising respectively red, green, and blue colour filters to colour the light passing through the sub-element. Each sub-element can be switched to transmit or block light using a liquid crystal. If all sub-elements of an element are switched off, the element will appear black. If all sub-elements of an element are switched on, the element will appear white/the colour of the backlight (this may also be considered as setting the element to transmit light with colour filters 'off').

In conventional video conferencing systems, the camera is positioned away from the display screen. This means that the local user, looking at a remote user on the display, will not be looking directly into the camera. As a result, the local user appears to the remote user to be looking away, making eye-to-eye contact impossible. Eye-to-eye contact is an important aspect of human communication. The inability to make eye-to-eye contact may limit the usefulness of videoconferencing as an alternative to in-person communication.

SUMMARY OF THE INVENTION

According to a first aspect of the invention there is provided a method of operating a LCD device. The device comprises an LCD screen held by and forming an enclosure with a housing, a camera positioned within the housing behind the LCD screen, and a backlight positioned within the housing and arranged to illuminate the LCD screen. The method comprises:
 displaying a first image on the LCD screen by setting a first set of elements of the LCD screen to transmit light and illuminating the LCD screen with the backlight;
 switching off the backlight, and with the backlight switched off:
  setting a second set of elements of the LCD screen to transmit light with colour filters off; and
  capturing an image with the camera through the second set of elements; and
 after capturing the image, displaying a second image on the LCD screen by setting a third set of elements of the LCD screen to transmit light and illuminating the LCD screen with the backlight.

Positioning the camera behind the LCD display allows eye-to-eye contact to be made during a video conferencing call. However, there is then a need to allow the camera to 'see' the user, without the user being able to see that camera and without the video being displayed on the screen being interrupted.

The above method solves this problem by controlling the way the LCD screen operates. Images/frames of a video are displayed as normal for an LCD screen. However, in between the images, the backlight is turned off, and a set of elements is set to allow transmission of light. This means that light from the viewer can enter the device through the transmissive screen, and be captured by the camera. As the housing is enclosed and the backlight is off, the screen appears black to the viewer, obscuring the camera.

Setting the second set of elements of the LCD screen to transmit light with colour filters off may in particular comprise setting each red, green, and blue sub-element of each element within the second set to transmit light, for example with substantially equal intensities. In other words, the second set of elements are set to a 'white screen' setting— i.e. a setting that would result in a white image (when viewed by humans) being displayed on the screen if the backlight was on.

The second set of elements may comprise one or more elements of the first set of elements. Similarly, the third set of elements may comprise one or more elements of the first set of elements and/or second set of elements. The second set of elements may in particular comprise all or substantially all of the elements of the display.

In some embodiments, the first image and second image may be respectively a first frame and second frame of a video being displayed on the LCD device.

In some embodiments, the method may further comprise:
 displaying a sequence of additional images on the LCD screen;
 capturing further images with the camera between displays of the additional images of the sequence of additional images.

An image may be captured after display of every additional image, after every other additional image, or after any predetermined number of displayed additional images. The predetermined number may be based on the frame rate of the camera, and/or on a comparison of the frame rate the camera to the refresh rate of the screen. Thus for example, for a screen with a 60 Hz repetition rate and a camera with a 30 Hz frame rate, an image may be captured after every second frame/image displayed on the screen. Where an image is not captured between displayed frames, a black screen may be presented (i.e. elements switched to 'off' but with backlight on), or the screen may be switched to transmit with the backlight off (as if an image was being captured).

In some embodiments, the captured images may be processed into a captured video stream. The captured video stream may be transmitted to a remote user, for example as part of a video call.

In some embodiments images may be displayed on the LCD screen at a first rate, and images may be captured by the camera at a second rate. The second rate may be lower than the first rate. The first rate may be the refresh rate of the LCD screen. The second rate may be the frame rate of the camera.

In some embodiments the first and second images may be displayed on the LCD screen for a first time period, and the second set of elements may be set to transmit for a different second time period. The image is captured during the second time period. The second time period may be shorter than the first time period. The second time period may be determined based on the shutter speed of the camera. The first time period may be determined by the second time period, and by the refresh rate of the LCD screen. For example, the first time rate may be between 9 ms and 20 ms.

In some embodiments, the image/s captured by the camera may be an image of a user of the device, and the first and second images (and any additional images) displayed on the display screen may be images of a remote user, the remote user in a video call with the user of the device.

According to a second aspect of the invention there is provided a liquid crystal display (LCD) device comprising:
 a housing;
 an LCD screen held by the housing such that the LCD screen and the housing form an enclosure, the LCD screen comprising a plurality of elements;
 a camera positioned within the housing behind the LCD screen;
 a backlight positioned within the housing and arranged to illuminate the LCD screen; and
 a controller configured to perform the method of any of embodiment of the first aspect.

In some embodiments, the interior of the housing and a body of the camera may be black or substantially black in colour. This may substantially prevent any reflection within the housing when the second set of elements are set to transmit light. Reflections may otherwise illuminate the camera, making it visible to the user.

In some embodiments the device may be selected from the list comprising: a portable computing device; a television; a computer monitor; and a video conferencing device.

According to a third aspect of the invention there is provided a controller for an LCD device (such as an LCD device according to any embodiment of the second aspect) comprising instructions which, when executed, cause the controller to perform the method of any embodiment of the first aspect.

According to a fourth aspect of the invention there is provided a computer program comprising instructions which, when executed by a controller of an LCD device (such as a controller according to the third aspect), cause the controller to perform the method of any of claims 1-10.

BRIEF DESCRIPTION OF THE DRAWINGS

By way of example only, certain embodiments of the invention shall now be described by reference to the accompanying drawings, in which.

DETAILED DESCRIPTION

In conventional LCD screens, a video is displayed by illuminating the screen with the backlight. Whilst the screen is illuminated, a set of elements (or for colour screens, a set of sub-elements) are set to transmit the backlight to form a first image of the video. A second image is then displayed by setting a different set of elements (or sub-elements) to transmit light, and so on. In between the individual images, a black image may be inserted to smooth the transition between images. This black image is formed by switching all elements to 'off'—i.e. block light—whilst keeping the backlight illuminated.

In the present invention, it has been realised that this method of limiting blur between displayed frames of a video presents the opportunity to capture an image of the viewer with a camera positioned behind the LCD screen, without the viewer noticing the camera. In the present method, rather than setting all of the elements to block light from the backlight to provide a black screen, all of the elements are set to transmit light (a 'white image' setting)—but with the backlight off. It has been realised that if the LCD device is formed of a sealed enclosure, with dark coloured interior walls and interior components, the viewer of the 'white image' will actually see a dark screen. The de-blurring dark screen effect of conventional LCD viewing is therefore maintained. However, as the elements of the screen are actually transmitting light, light from outside the LCD device can pass through the screen and be captured by the camera. The 'white screen' setting therefore allows the camera to capture an image of the viewer through the LCD screen, without the viewer being aware of the camera, and without video display on the screen being affected.

It has further been realised that as the frame rates of cameras, particularly typical video conferencing cameras, are lower than the typical refresh rates of LCD screens, the window of image capture provided by the de-blurring gap in-between display of video frames on the screen is sufficient to allow substantially unaffected video recording of the local viewer. Thus not only is the quality of viewing experience of the local user maintained as for a conventional LCD screen; the quality of viewing experience for a remote user watching a video feed of the local user is maintained. The difference is that the local user and remote user can now make eye-to-eye contact during their conversation, providing a more natural conversational experience.

Figure 1:
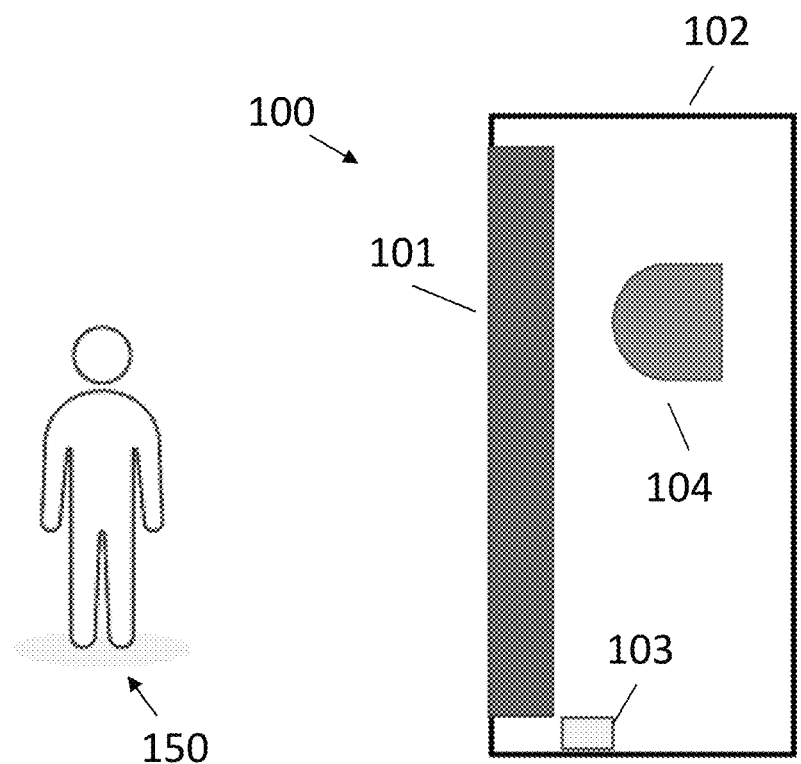
FIG. 1 is a schematic representation of an LCD device according to the present invention.

FIG. 1 illustrates an LCD device 100 capable of providing eye-to-eye contact during video calls. LCD device 100 may for example be a dedicated video conferencing screen, or may be a multi-purpose electronic device such as a smartphone or tablet computer, capable of providing video calls.

Device 100 comprises an LCD screen 101 held by a housing 102. The LCD screen 101 closes the only open face of housing 102, so that that LCD screen 101 together form an enclosure. The enclosure is such that light can only enter the interior of the enclosure passing through the LCD screen 101.

A backlight 103 is positioned within the housing 102. The backlight 103 illuminates the inwards facing side of the LCD screen 101. As discussed above, the LCD screen 101 selectively transmits light from the backlight through a set of elements (or sub-elements) in the screen 101 to form an image on the screen 101. LCD screen 101 and backlight 103 may be any standard LCD screen and backlight arrangement.

A camera 104 is also positioned within the housing 102. The camera is positioned such that it can capture images of outside of the device 100 through the LCD screen 101. In other words, the camera 104 (or an aperture thereof) faces or receives light from the interior surface of the LCD screen 101. The camera 104 and the interior surfaces of the housing 102 are substantially coloured black, to prevent any light reflection within the housing 102 that may make the camera visible a viewer 150 watching the LCD screen 101.

Figure 2:
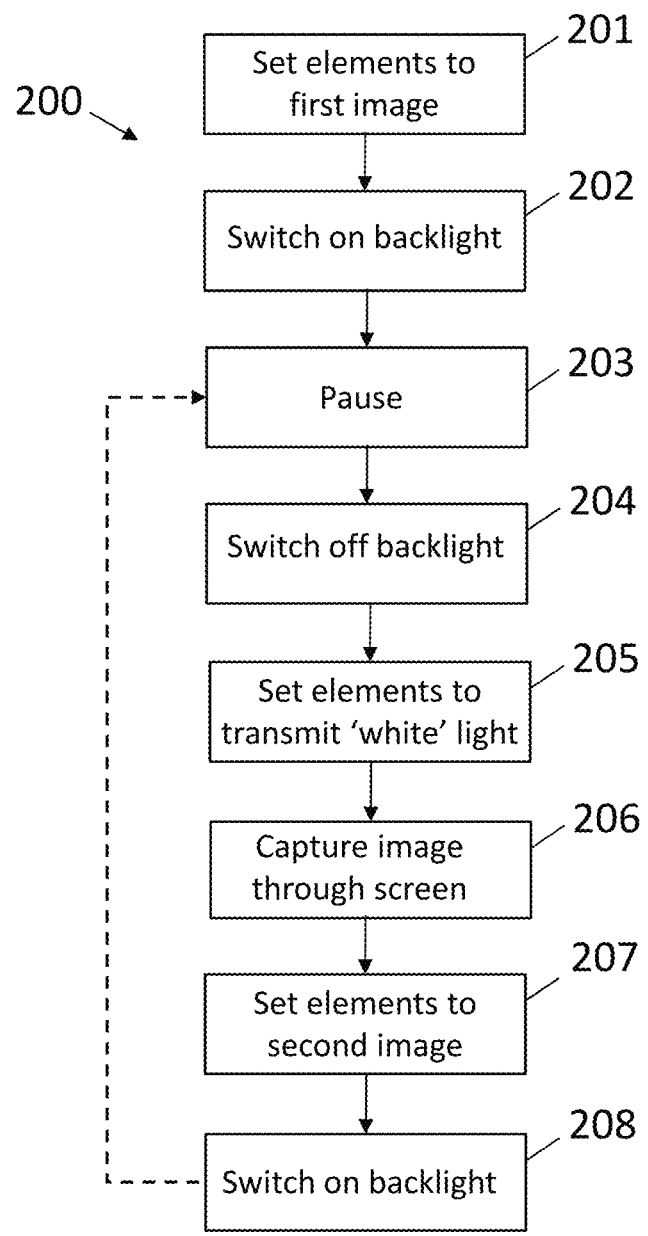
FIG. 2 illustrates a method of operating the LCD device of FIG. 1.

FIG. 2 illustrates a method 200 of operating the LCD device 100 to capture an image of the viewer 150 whilst different images (e.g. frames of a video) are displayed on the screen 101.

Method 200 starts at step 201. At step 201, a first set of elements of the LCD screen 101 are set to transmit light to form a first displayed image on the screen. Setting the first set of elements may comprise setting particular coloured sub-elements of those elements to transmit, to produce a colour image. Elements of the screen 101 that are not part of the first set of elements are kept in an off state, blocking transmission of light.

At step 202, the backlight 103 is illuminated. Light from the backlight 103 passes through those elements (or sub-elements) which are set to transmit. As a result, the viewer 150 sees the first image on the screen.

At step 203, the first image is held on the screen during a predetermined portion of time, so that the viewer 150 has time to see the image. The predetermined portion of time is based on the refresh rate of the screen 101 (e.g. 50 Hz or 60 Hz), and the shutter speed of the camera 104 (i.e. the time the camera takes to capture an image). In particular, the predetermined portion of time may be the inverse of the refresh rate minus the shutter speed (when shutter speed is measured in seconds).

After the predetermined portion of time, the method proceeds to step 204. At step 204, the backlight is switched off.

At step 205, with the backlight 103 still switched off, a second set of elements of the LCD screen 101 are set to transmit light with their colour filters off. In other words, all sub-elements of each element of the second set are set to transmit light, equivalent to setting a 'white screen' image on the screen (if the backlight was on). The second set of elements may be all the elements on the screen, or a sub-set of elements. For example, a smaller area of the screen 101 lined up with the field of view of the camera 104 may be set to transmit light, whilst other elements of the screen 101 are set to block light.

It is to be noted that although 'white screen' is used herein to describe the setting of the elements in step 205, to the viewer 150 the screen 101 appears black. The backlight 103 is off, and the housing 102 is otherwise sealed, so there is no source of light illuminating the interior of the screen 101 that could be seen by the viewer 150, making the screen appear black. The term 'white screen' is used only to denote a setting of elements of the LCD screen which allows light that to humans appears to be white (due to the combination of red, green, and blue sub-elements) to pass through the screen 101.

At step 206, with the backlight 103 still switched off, an image of the area in front of the LCD device 100 is captured by the camera 104 through the transmissive second set of LCD elements. If viewer 150 is in the field of view of the camera, an image of the viewer 150 will be captured.

After the image has been captured (e.g. after a predetermined time based on the shutter speed of the camera), the method 200 proceeds to step 207. At step 207, a third set of elements of the LCD screen 101 are set to transmit light to form a second displayed image. The process of setting the elements to transmit is similar to step 201 discussed above, but the set of elements/sub-elements involved may be different.

After setting the third set of elements, the method proceeds to step 208 (similar to step 202), at which the backlight 103 is switched on so that the viewer 150 sees the second displayed image on the screen 101.

The method 200 may then repeat the steps 203-206 to capture a further image with the camera 104 (as represented by the dotted arrow in FIG. 2). After capturing this further image, the method 200 may repeat steps similar to steps 201 and 202 to display an additional displayed image on the LCD screen 101. This process of displaying a displayed image, then capturing an image, then displaying another displayed image may be repeated as many times as required, for example until the end of a video call.

In alternative embodiments, the camera 104 may only capture images after two displayed images are shown on the screen 101, or after any other number of displayed images are shown on the screen 101. In some such embodiments, where an image is not captured by the camera 104 between displayed images, a conventional blur-limiting black screen (i.e. all LCD elements set to off) may be displayed.

Figure 3:
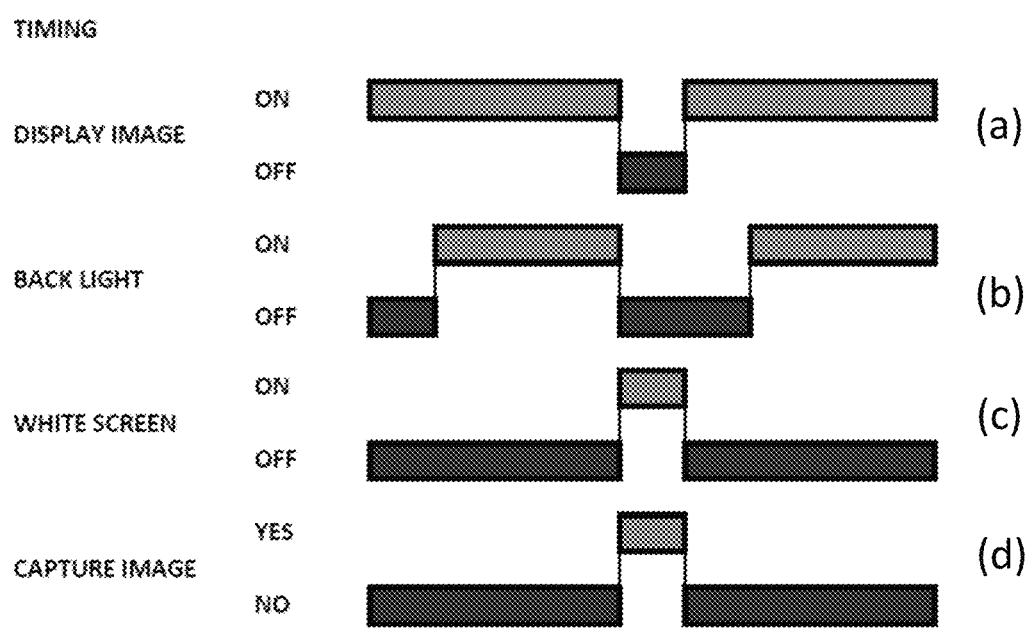
FIG. 3 further illustrates a method of operating the LCD device of FIG. 1.

FIG. 3 further illustrates the method 200 of operating the LCD device 100. FIG. 3 shows example timings for when various components of the LCD device 100 are controlled, relative to the other components.

FIG. 3(a) represents times when an elements of the screen are set to display an image on the screen 101. When the bar is shown as "on", the elements are set to display an image. The first "on" period in FIG. 3(a) represents display of the first displayed image, and the second "on" period represents display of the second displayed image.

FIG. 3(b) represents times when the backlight 103 is on or off. The backlight is turned on a small period of time after the corresponding image is set with the elements of the screen 101. This allows sufficient time for all elements to settle, before becoming visible to the viewer 150 due to illumination by the backlight 103. The backlight is turned off at the same time as the elements of the screen are changed to cease displaying the respective image.

FIG. 3(c) represents times when the screen (or a portion thereof) is set to a 'white screen'. When the bar in FIG. 3(c) is "on", the second set of elements are set to transmit light (as in step 205 of method 200).

FIG. 3(d) represents times when the camera 104 captures an image through the screen 101. The capture time (set e.g. by the shutter speed of the camera 104) matches the time the 'white screen' is shown on the display.

The method 200 may be implemented by a controller associated with the LCD device 100. The controller may be configured to control the elements of the LCD screen 101, control the backlight 103, and control the camera 104. The method 200 may be implemented as instructions stored in a computer readable medium which, when executed by a computer (e.g. a processer of an LCD device), cause the computer to perform the steps of method 200. The method 200 may be implemented as a computer program comprising instructions which, when executed by a computer (e.g. a processer of an LCD device), cause the computer to perform the steps of method 200.

Although the invention has been described above with reference to one or more preferred embodiments, it will be appreciated that various changes or modifications may be made without departing from the scope of the invention as defined in the appended claims.

The invention claimed is:

1. A method of operating a liquid crystal display, LCD, device, the device comprising an LCD screen held by and forming an enclosure with a housing, a camera positioned within the housing behind the LCD screen, and a backlight positioned within the housing and arranged to illuminate the LCD screen, wherein the interior of the housing and a body of the camera are black in colour, wherein the method comprises:
displaying a first image on the LCD screen by setting a first set of elements of the LCD screen to transmit light and illuminating the LCD screen with the backlight;
switching off the backlight, and with the backlight switched off:
setting a second set of elements of the LCD screen to transmit light with colour filters off such that the LCD screen appears to display a black image; and
capturing an image with the camera through the second set of elements; and
after capturing the image, displaying a second image on the LCD screen by setting a third set of elements of the LCD screen to transmit light and illuminating the LCD screen with the backlight.

2. The method of claim 1, wherein the first image and second image are respectively a first frame and second frame of a video being displayed on the LCD device.

3. The method of claim 1, further comprising:
displaying a sequence of additional images on the LCD screen;
capturing further images with the camera between displays of the additional images of the sequence of additional images.

4. The method of claim 3, further comprising processing the captured images into a captured video stream.

5. The method of claim 1, wherein images are displayed on the LCD screen at a first refresh rate, and wherein images are captured by the camera at a second refresh rate.

6. The method of claim 5, wherein the second refresh rate is lower than the first refresh rate.

7. The method of claim 1, wherein the first and second images are displayed on the LCD screen for a first time period, and the second set of elements are set to transmit for a second time period.

8. The method of claim 7, wherein the second time period is determined based on a shutter speed of the camera.

9. The method of claim 7, wherein the first time period is between 9 ms and 20 ms.

10. The method of claim 1, wherein the image captured by the camera is an image of a user of the device, and wherein the first and second images displayed on the display screen are images of a remote user, the remote user in a video call with the user of the device.

11. A liquid crystal display, LCD, device comprising:
a housing;
an LCD screen held by the housing such that the LCD screen and housing form an enclosure, the LCD screen comprising a plurality of elements;
a camera positioned within the housing behind the LCD screen;
a backlight positioned within the housing and arranged to illuminate the LCD screen;
wherein the interior of the housing and a body of the camera are black in colour, and
a controller configured to perform the method of operating the LCD device, the method comprising the steps of:
displaying a first image on the LCD screen by setting a first set of elements of the LCD screen to transmit light and illuminating the LCD screen with the backlight;
switching off the backlight, and with the backlight switched off:
setting a second set of elements of the LCD screen to transmit light with colour filters off such that the LCD screen appears to display a black image; and
capturing an image with the camera through the second set of elements; and
after capturing the image, displaying a second image on the LCD screen by setting a third set of elements of the LCD screen to transmit light and illuminating the LCD screen with the backlight.

12. The device of claim 11, wherein the device is selected from the list comprising: a portable computing device; a television; a computer monitor; and a video conferencing device.

13. A controller for an LCD device, wherein the LCD device comprises an LCD screen held by and forming an enclosure with a housing, a camera positioned within the housing behind the LCD screen, and a backlight positioned within the housing and arranged to illuminate the LCD screen, wherein the interior of the housing and a body of the camera are black in colour; and wherein the controller comprises instructions which, when executed, cause the controller to perform a method of operating the LCD device, the method comprising the steps of:
displaying a first image on the LCD screen by setting a first set of elements of the LCD screen to transmit light and illuminating the LCD screen with the backlight;
switching off the backlight, and with the backlight switched off:
setting a second set of elements of the LCD screen to transmit light with colour filters off such that the LCD screen appears to display a black image; and
capturing an image with the camera through the second set of elements; and
after capturing the image, displaying a second image on the LCD screen by setting a third set of elements of the LCD screen to transmit light and illuminating the LCD screen with the backlight.

14. A tangible, non-transitory, computer-readable media having recorded thereon computer program code, which when executed by a controller of a liquid crystal display, LCD, device, cause the controller to perform a method of operating the LCD device, wherein the LCD device comprises an LCD screen held by and forming an enclosure with a housing, a camera positioned within the housing behind the LCD screen, and a backlight positioned within the housing and arranged to illuminate the LCD screen, wherein the interior of the housing and a body of the camera are black in colour; and
wherein the method comprises the steps of:
displaying a first image on the LCD screen by setting a first set of elements of the LCD screen to transmit light and illuminating the LCD screen with the backlight;
switching off the backlight, and with the backlight switched off:
setting a second set of elements of the LCD screen to transmit light with colour filters off such that the LCD screen appears to display a black image; and
capturing an image with the camera through the second set of elements; and
after capturing the image, displaying a second image on the LCD screen by setting a third set of elements of the LCD screen to transmit light and illuminating the LCD screen with the backlight.

15. A method of operating a display device, the device comprising an Organic Light Emitting Diode, OLED, display screen having a plurality of elements, each element being arranged to be reversibly set to either an "on" state in which the element displays a colour, or an "off" state in which the element is transparent and does not display a colour, the OLED display screen held by and forming an enclosure with a housing, a camera positioned within the housing behind the OLED display screen, wherein the interior of the housing and a body of the camera are black in colour, and wherein the method comprises:

displaying a first image on the OLED display screen by setting a first set of the plurality of elements of the OLED display screen to the on state;

setting a second set of the plurality of elements of the OLED display screen to the off state such that the OLED screen appears to display a black image;

capturing an image with the camera through the second set of elements; and after capturing the image, displaying a second image on the OLED display screen by setting a third set of elements of the OLED display screen to the on state.

16. The method of claim 15, further comprising:
displaying a sequence of additional images on the OLED display screen;
capturing further images with the camera between displays of the additional images of the sequence of additional images.

17. The method of claim 15, wherein images are displayed on the OLED display screen at a first refresh rate, and wherein images are captured by the camera at a second refresh rate.

18. The method of claim 15, wherein the first and second images are displayed on the OLED display screen for a first time period, and the second set of elements are set to the off state for a second time period.

19. The method of claim 15, wherein the image captured by the camera is an image of a user of the device, and wherein the first and second images displayed on the display screen are images of a remote user, the remote user in a video call with the user of the device.

* * * * *